Dec. 3, 1963 J. F. GILMORE 3,113,219

VARIABLE RESET TIME MONOSTABLE MULTIVIBRATOR

Filed July 6, 1960 2 Sheets-Sheet 1

INVENTOR
J. F. GILMORE
BY V. P. Priolo
ATTORNEY

Dec. 3, 1963 J. F. GILMORE 3,113,219

VARIABLE RESET TIME MONOSTABLE MULTIVIBRATOR

Filed July 6, 1960 2 Sheets-Sheet 2

INVENTOR
J. F. GILMORE
BY V. P. Priolo
ATTORNEY

United States Patent Office 3,113,219

Patented Dec. 3, 1963

3,113,219
VARIABLE RESET TIME MONOSTABLE MULTIVIBRATOR

John F. Gilmore, South Ozone Park, N.Y., assignor to Bell Telephone Laboratories, Incorporated, New York, N.Y., a corporation of New York Filed July 6, 1960, Ser. No. 41,163
4 Claims. (Cl. 307—88.5)

This invention relates to control circuits and more particularly to multivibrators comprising variable reset time means.

In many applications where pulse recognition is necessary, it has been found desirable to "reject" a multivibrator input trigger, i.e., stop the capacitor charge cycle and return the multivibrator to its quiescent state so that it is ready for the next incoming trigger. Although it appears that to accomplish this it is only necessary to trigger the "off" transistor "on" directly, it has been found that this method is not reliable.

It is, therefore, the object of this invention to provide a multivibrator with reliable means for "rejecting" an undesired input trigger.

It has been found that this objective may be achieved by employing an additional transistor which, in turn, is triggered by an external "rejection" sensing means.

A feature of this invention resides in the use of the collector-emitter saturation voltage of an additional transistor to clamp the "off" transistor "on."

Other objects and features of the present invention will become apparent upon consideration of the following detailed description when taken in connection with the accompanying drawings in which.

Figure 1:
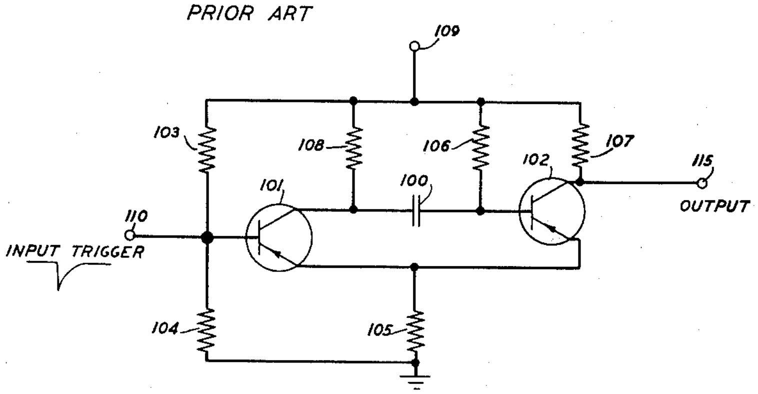
FIG. 1 PRIOR ART
FIG. 1 is the schematic representation of a monostable multivibrator such as taught by the prior art.

Referring now to FIG. 1 of the drawing, the prior art has taught this emitter-coupled monostable multivibrator with a fixed reset time determined by the circuit parameters. Two transistors 101 and 102 are employed with the base of transistor 102 capacitively (100) coupled to the collector of transistor 101. A resistive feedback loop comprising resistors 103 and 107 is provided from the collector of transistor 102 to the base of transistor 101. A similar resistive feedback loop comprising resistors 106 and 108 is connected from the collector of transistor 101 to the base of transistor 102. Resistors 104 and 105 are biasing resistors in the quiescent state. Terminal 109 is connected to a source of negative potential if, as shown, p-n-p transistors are used. Transistors of the n-p-n type could be used equally as effectively, in which case terminal 109 would be connected to a source of positive potential. An input negative trigger is necessary at terminal 110 to turn p-n-p transistor 101 "on." If transistor 101 were an n-p-n transistor, a positive trigger would be required.

In the normal or quiescent state, transistor 101 is biased "off" and transistor 102 is biased "on" usually at saturation. As noted heretofore, a negative trigger impressed at terminal 110 turns transistor 101 "on" causing base current to flow which, in turn, causes collector current to flow, thus resulting in a positive voltage rise at the collector of transistor 101. The positive voltage rise is capacitively coupled via capacitor 100 to the base of transistor 102, thus tending to reduce the emitter-to-collector current flow in transistor 102. This current change is reflected in resistor 105 and positively fed back to transistor 101 thereby biasing it further into its conducting region which, as described above, further reduces the emitter-to-collector current flow in transistor 102 which is thus driven into cut-off. Transistor 102 remains "off" until capacitor 100 is fully charged. At this point the base and emitter electrodes of transistor 102 are at the same potential, thus biasing transistor 102 "on" which, in turn, turns "off" transistor 101. The period of time transistor 101 is "on," i.e., the time it takes for the capacitor to charge, depends upon the circuit parameters. The parameters are usually chosen so as to yield an output pulse of the desired period. Once transistor 101 is "on" the circuit will not return to its quiescent state until the capacitor charge is discharged and the subsequent recharge cycle is completed. The time required for the charge period is referred to as reset time. After the charge period is completed, the capacitor 100 must discharge the stored charge through transistor 102 and, in turn, charge to an equal value with opposite polarity before another trigger may be applied at terminal 110. The time required for this discharge and subsequent charge is referred to as recovery time and is usually a considerably shorter period of time than the reset time. In order to "reject" an incoming trigger at terminal 110, it is necessary to stop the capacitor charge period, i.e., have a variable reset time, and return the circuit to its quiescent state so that it will be ready for the next incoming trigger.

Figure 2:
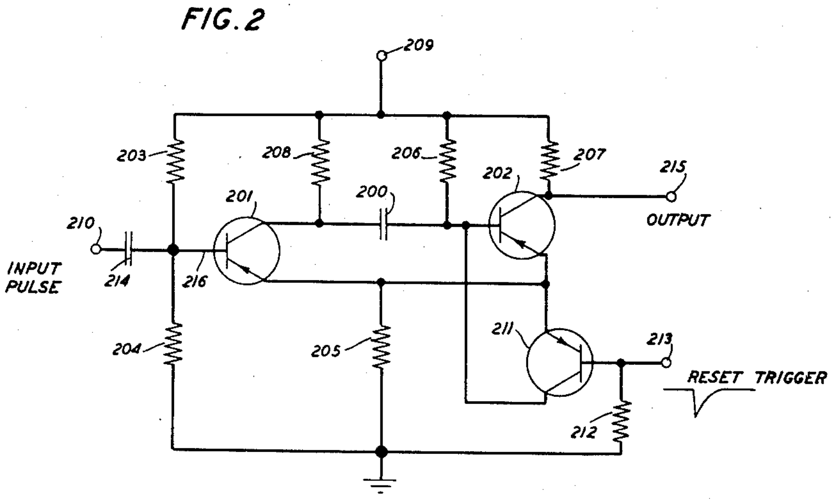
FIG. 2 is a schematic representation of a monostable multivibrator comprising an embodiment of the invention.

The novel structure of FIG. 2 proposes a third externally triggered p-n-p transistor 211 to provide variable reset time. The designated numerals of FIG. 2 are identical to those of FIG. 1 except that the first digit has been changed to correspond to the figure number. The functions of the equivalent components are the same in each structure. The collector-emitter electrodes of transistor 211 are connected across the base-emitter electrodes of transistor 202. Although in FIG. 2 transistor 211 is shown as a p-n-p transistor, an n-p-n transistor could be used equally as effectively.

Figure 3:
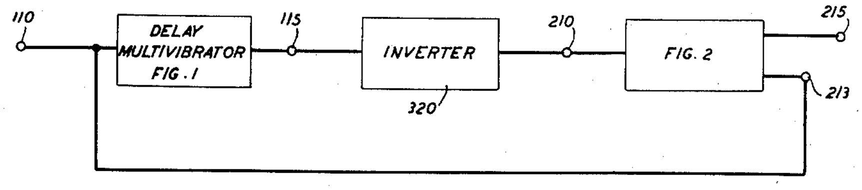
FIG. 3 is an illustrative system in which the present invention might be employed.

In the structure of FIG. 2 external means are necessary to provide a reset trigger so that an undesired input trigger may be "rejected." For example, as shown in FIG. 3, the structure of FIG. 1 might be employed as a delay multivibrator, the output 115 of which is connected to the input terminal 210 of FIG. 2 through inverter 320. Terminal 213 is connected to the input terminal 110. The inverter 320 is necessary to obtain proper trigger polarity since the structures of FIGS. 1 and 2 use p-n-p transistors. The operation of the example system shown in FIG. 3 can best be understood by referring to FIG. 4.

Figure 4:
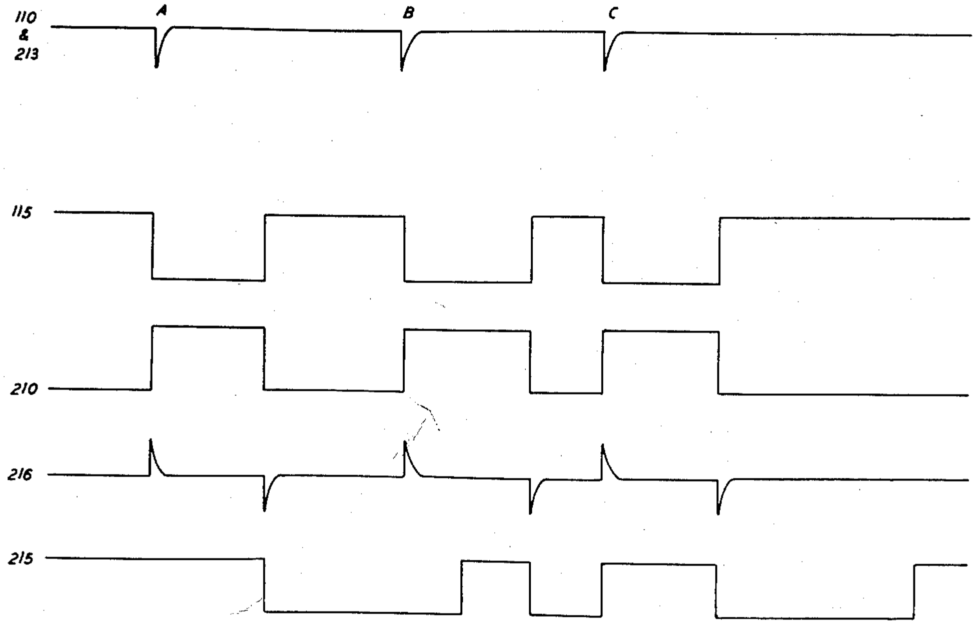
FIG. 4 shows the wave shapes of the system of FIG. 3.

Since terminals 110 and 213 are connected together, an input trigger A applied at terminal 110 will simultaneously appear at terminal 213 as shown on FIG. 4. Transistor 101 will be turned "on" and transistor 102 turned "off" for a period of time determined by the circuit parameters, as discussed previously. The transistor 211 will be turned "on" for the period of the input trigger only since the polarity of the charge on capacitor 200 is such as to hold transistor 211 "off." The output pulse appearing at terminal 115 is inverted by inverter 320 and differentiated by resistor 204 and capacitor 214. It is assumed for illustrative purposes that the inverter 320 has zero time delay. Thus the leading edge of the pulse appearing at terminal 210 results in a positive trigger at the base 216 of transistor 201 and the trailing edge results in a negative trigger at the base 216 of transistor 201. The negative trigger turns p-n-p transistor 201 "on," hence turning transistor 202 "off." The output appears at terminal 215 as shown in FIG. 4. As before, the duration of the output pulse is determined by the circuit parameters.

The duration or period of time between the input triggers A and B of FIG. 4 is sufficient to allow sufficient time for the system to return to its quiescent state, hence input trigger B will start the same sequence of events in the same manner as input trigger A described above. The duration of time between input triggers B and C is not sufficient for normal system operation. Hence it is desirable to "reject" trigger B and allow trigger C to start normal operation. As shown on FIG. 4, at the time trigger C is applied, trigger B has caused transistor 201 to be turned "on" and transistor 202 to be turned "off." Capacitor 200 is charging in such a manner as to make the collector of transistor 211 more negative. When input trigger C is applied at terminal 110 and terminal 213 (across biasing resistor 212) transistor 211 is biased "on," preferably at saturation. The transistor 211 remains "on" when input trigger C is removed at terminals 110 and 213 because of the polarity of the charge on capacitor 200 due to trigger B. The base-to-emitter terminals of transistor 202 are now "clamped" to the collector-to-emitter voltage of transistor 211 hence turning transistor 202 "on." In transistors of the same conductivity type, the collector-to-emitter saturation voltage is usually less than the base-to-emitter saturation voltage. As discussed in connection with FIG. 1, turning "on" transistor 202 causes capacitor 200 to discharge and then charge to the same value with opposite polarity, thus turning "off" transistor 201 and returning the configuration to its quiescent state. Since this recovery time is comparatively short, the circuit of FIG. 2 is readily prepared for the delayed trigger C. As shown in FIG. 4, the input trigger C will now have the same effect as input trigger A and the sequence of events will be the same as discussed in connection with trigger A. Since input trigger B is effectively "rejected" by input trigger C, the duration of the output pulse appearing at terminal 215 is prematurely terminated and hence ineffective on the circuitry connected to terminal 215.

Although p-n-p transistors have been used exclusively in the foregoing description, it should be understood that n-p-n transistors or combinations of p-n-p and n-p-n transistors could be used equally as effectively.

Since changes may be made in the above-described arrangement and different embodiments may be devised by those skilled in the art without departing from the scope and spirit of the invention, it is to be understood that all matter contained in the foregoing description and accompanying drawings is illustrative of the application of the principles of the invention and is not to be construed in a limiting sense.

What is claimed is:

1. In a variable reset time monostable multivibrator first, second and third transistors, each of said transistors having base, collector and emitter electrodes, a capacitor, a source of potential having a ground and a first terminal, means for connecting the emitter electrodes of said first, second and third transistors, means for connecting the collector electrode of said third transistor to the base of said second transistor, means for connecting the ground terminal of said source of potential to the base electrode of said first transistor, the emitter electrodes of said first, second and third transistors, and the base electrode of said third transistor, each of said means comprising an individual impedance means, means for connecting the first terminal of said source of potential to the base electrode of said second transistor, the collector electrode of said second transistor, the collector electrode of said first transistor and the base electrode of said first transistor, each of said means comprising an individual impedance means, means for connecting the collector electrode of said first transistor to the base electrode of said second transistor, said means comprising said capacitor, means for triggering the base-emitter electrodes of said third transistor whereby said second transistor is biased into conduction.

2. A variable reset time monostable multivibrator in accordance with claim 1 wherein said first, second and third transistors are of the same conductivity type.

3. In a variable reset time monostable multivibrator first, second and third transistors, each of said transistors having base, collector and emitter electrodes, a capacitor, a source of potential having a ground and a first terminal, means for connecting the emitter electrodes of said first, second and third transistors, means for collecting the collector electrode of said third transistor to the base electrode of said second transistor, means for connecting the ground terminal of said source of potential to the base electrode of said first transistor, the emitter electrode of said first, second and third transistors and the base electrode of said third transistor, each of said means comprising an individual impedance means, means for connecting the first terminal of said source of potential to the base electrode of said second transistor, the collector electrode of said second transistor, the collector electrode of said first transistor and the base electrode of said first transistor, each of said means comprising an individual impedance means, means for connecting the collector electrode of said first transistor to the base electrode of said second transistor, said means comprising said capacitor, means for triggering the base-emitter electrodes of said third transistor to drive said third transistor into saturation whereby the collector-to-emitter saturation voltage of said third transistor drives the base-emitter electrodes of said second transistor into conduction.

4. A variable reset monostable multivibrator in accordance with claim 3 wherein said first, second and third transistors are of the same conductivity type.

References Cited in the file of this patent

UNITED STATES PATENTS

| | | |
|---|---|---|
| 2,837,663 | Walz | June 3, 1958 |
| 2,885,547 | Taggart | May 5, 1959 |
| 2,975,300 | Haugen et al. | Mar. 14, 1961 |